US008751823B2

(12) United States Patent
Myles et al.

(10) Patent No.: US 8,751,823 B2
(45) Date of Patent: Jun. 10, 2014

(54) SYSTEM AND METHOD FOR BRANCH FUNCTION BASED OBFUSCATION

(75) Inventors: Gideon M. Myles, San Jose, CA (US); Julien Lerouge, Santa Clara, CA (US); Jon McLachlan, San Francisco, CA (US); Ganna Zaks, Mountain View, CA (US); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 330 days.

(21) Appl. No.: 13/195,748

(22) Filed: Aug. 1, 2011

(65) Prior Publication Data

US 2013/0036473 A1  Feb. 7, 2013

(51) Int. Cl.
*G06F 21/22* (2006.01)

(52) U.S. Cl.
USPC ........... 713/190; 713/194; 717/141; 717/159; 712/208; 712/211; 712/234; 712/238; 726/26

(58) Field of Classification Search
CPC ....... G06F 21/12; G06F 21/125; G06F 21/14; G06F 8/443; G06F 9/30069; G06F 9/30145; G06F 9/30181; G06F 9/3017; G06F 9/30054; G06F 9/30058
USPC ............. 726/26; 717/141, 159; 712/208, 211, 712/234, 238; 713/190, 194
See application file for complete search history.

(56) References Cited

U.S. PATENT DOCUMENTS

| 7,818,552 | B2 | 10/2010 | Jungwirth |
| 2010/0306746 | A1* | 12/2010 | Barua et al. .................... 717/136 |
| 2011/0035733 | A1* | 2/2011 | Horning et al. ............... 717/140 |

FOREIGN PATENT DOCUMENTS

| EP | 1 936 532 B1 | 7/2009 | |
| EP | 2 159 732 A1 | 3/2010 | |
| WO | WO 2008/074382 A1 * | 6/2008 | .............. G06F 21/00 |

OTHER PUBLICATIONS

Linn et al., Obfuscation of Executable Code to Improve Resistance to Static Disassembly, ACM Conference on Computer and Communications Security (CCS), 2003, ACM Press, pp. 290-299.*
Valery Pryamikov, "Call Tree Transformation for Program Obfuscation and Copy Protection," R. Safavi-Naini and M. Yung (Eds.): DRMTICS 2005, LNCS 3919, 2006, pp. 164-179, Springer-Verlag Berlin Heidelberg 2006.
Abdulrahman Alarifi and Wenliang Du, "Diversify Sensor Nodes to Improve Resilience Against Node Compromise," SASN'06, Oct. 30, 2006, Alexandria, Virginia, USA, ACM, 2006.

* cited by examiner

*Primary Examiner* — Eleni Shiferaw
*Assistant Examiner* — Paul Callahan
(74) *Attorney, Agent, or Firm* — Novak Druce Connolly Bove + Quigg LLP (57) ABSTRACT

Disclosed herein are systems, methods, and non-transitory computer-readable storage media for obfuscating branches in computer code. A compiler or a post-compilation tool can obfuscate branches by receiving source code, and compiling the source code to yield computer-executable code. The compiler identifies branches in the computer-executable code, and determines a return address and a destination value for each branch. Then, based on the return address and the destination value for each branch, the compiler constructs a binary tree with nodes and leaf nodes, each node storing a balanced value, and each leaf node storing a destination value. The non-leaf nodes are arranged such that searching the binary tree by return address leads to a corresponding destination value. Then the compiler inserts the binary tree in the computer-executable code and replaces each branch with instructions in the computer-executable code for performing a branching operation based on the binary tree.

25 Claims, 6 Drawing Sheets

SYSTEM AND METHOD FOR BRANCH FUNCTION BASED OBFUSCATION

BACKGROUND

1. Technical Field

The present disclosure relates to software protection and more specifically to obfuscating branches in software using trees representing return address and destination value pairs.

2. Introduction

Obfuscation is making compiled computer code more difficult to understand while still retaining the same or substantially the same functionality. Obfuscation generally frustrates reverse engineers, and can push reverse engineering attempts away from static analysis and into more costly dynamic analysis. Any increase in obfuscation complexity adds another layer of difficulty and cost to reverse engineering attempts.

One obfuscation approach converts branches to calls to a branching function. When a call instruction is executed, the branching function pushes the address of the next instruction on the stack and transfers execution to the called function. Upon completion of the called function, the return address is popped from the stack so that execution can resume at the instruction immediately following the call instruction. On the other hand, an unconditional jump simply transfers execution to the target destination of the jump instruction. Because the call and unconditional jump instructions function differently, when a jump instruction is replaced with a call, the called function has to know how to transfer execution to the target destination instead of the instruction immediately following the call instruction.

In this obfuscation approach, the branch function identifies the target destination through a table lookup. A table maps the return address to the destination by absolute address or by a displacement from the return address. The table is organized such that the hash of the return address yields the index into the table, i.e. destAddr=T[h(retAddr)]. When the branch function executes, it computes the destination address by hashing the return address on the stack. The return address on the stack is then replaced with the computed destination address. When the branch function completes, the function returns to the target destination instruction instead of the instruction following the call instruction. Such obfuscation techniques remove obvious control flow from the static binary, thereby forcing attackers to resort to more computationally expensive dynamic analysis.

However, this obfuscation technique has a number of drawbacks. A traditional hash table stores the key value pair in order to resolve collisions. In the software protection context, storing the key and value together is undesirable because an attacker can more easily discover the exact information the obfuscation attempts to hide. One method to eliminate this problem is to use a perfect hash function that guarantees each key to hash to a unique table index. However, a perfect hash function is not always practical due to cost, storage space, or computing power constraints. A perfect hash function is also specific to the data set, so each unique data set requires recalculating a perfect hash function. Additionally, a perfect hash function can only be generated once all of the jump, destination pairs have been identified. Because of this, the branch function, which is executed at run time, must be modified to use the perfect hash function to compute the destination address. Such modifications may not always be possible.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The obfuscation approaches disclosed herein address the drawbacks of a hash table based branch function obfuscation technique. These approaches make use of alternative storage structures and look up techniques. One implementation stores destination information in a specially designed tree structure, such as a binary tree, instead of a hash table. The system can search the tree by return address to fetch the corresponding destination value, but the return address is never stored in the tree. The binary tree is constructed such that all of the internal nodes are constants and the leaf nodes are the destination values. Intermediate nodes can also be destinations, i.e. return address parity could indicate "leaf" or "leaf's parent" as storing the destination value. The system can select and order the constants to facilitate searching the tree by return address. In the branch function, to look up the destination address, the system compares the return address to the node value. In a binary tree, based on the relationship with the node value, the system continues to search either with the left or the right child. This process continues until reaching a leaf node representing the destination value.

Disclosed are systems, methods, and non-transitory computer-readable storage media for generating obfuscated code. A system configured to practice the method receives source code and compiles the source code to yield computer executable code according to the following steps. The system identifies a set of branches in the source code and determines a return address and a destination value for each branch of the set of branches.

Based on the return address and the destination value for each branch, the system constructs a binary tree with nodes and leaf nodes, each node storing a constant value to yield constant values, and each leaf node storing a destination value to yield destination values, wherein the constant values are arranged such that searching the binary tree by return address leads to a corresponding destination value. The system can change these constant values dynamically at runtime. The binary tree does not store return addresses for the set of branches, but is arranged such that a traversal of the binary tree by return address leads to the corresponding destination value. Then the system inserts the binary tree in the computer executable code, and replaces each of the selected branches with instructions in the computer executable code for performing a branching operation based on the binary tree. The system can store all or part of the tree in a text section of the compiled code. In one aspect, part of the tree is stored in the text section of the compiled code, and another part of the tree is stored in the data section of the compiled code.

In one variation, the system estimates a size for the binary tree based on the set of branches and constructs the binary tree based on the size. However, if the binary tree is too small to accommodate the branches, then the system can replace fewer than all of the branches with instructions in the computer executable code for performing the branching operation based on the binary tree. Alternatively, if the binary tree is too small to accommodate the branches, the system can estimate a revised size for the binary tree, and reconstruct the binary tree based on the revised size.

The tree structure can be a binary tree, a B tree, a multi-way tree, or other type of tree. While the hash approach set forth above has certain problems, the access time of a perfect hash is O(1), whereas the access time of a binary tree is O(log(n)). The system can balance or otherwise optimize the tree data structure to minimize the traversal steps required to access leaf nodes. For example, the system can reduce n to the smallest possible value. This can reduce the time and processing requirements for locating the appropriate leaf node.

Also disclosed are systems, methods, and non-transitory computer-readable storage media for executing obfuscated code. In this approach, at a branch represented by a replaced branch instruction, the system determines a return address for the replaced branch instruction. The branch can be a conditional jump instruction or an unconditional jump instruction. Then, the system searches a tree data structure, based on the return address, to determine a destination value corresponding to the return address, wherein the tree data structure does not contain the return address, and wherein a position of the destination value within the tree data structure is based on the return address. The system can then execute the replaced branch instruction by jumping to the destination value, and, after executing additional instructions associated with the branch, jumping back to the return address.

Also disclosed herein is a hybrid hash and tree approach. The system can obfuscate branches in the code using a hash table with an imperfect hash function. When a collision in the hash table is detected, the system can establish a tree for pairs that collide at the same slot in the hash table. Thus, the system can generate multiple small trees for each slot in the hash table that has a collision. In this way, the system can take advantage of the O(1) speed of the hash approach for some replaced branches while avoiding many of the disadvantages of the hash table only approach. This approach can also reduce the time to traverse the trees because the depth of the tree will be smaller than if all the values were stored in a tree.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for obfuscating software. A brief introductory description of a basic general purpose system or computing device in FIG. 1 which can be employed to practice the concepts is disclosed herein. A more detailed description of obfuscation using a tree structure and variations thereon shall be discussed herein as the various embodiments are set forth. The disclosure now turns to FIG. 1.

Figure 1:
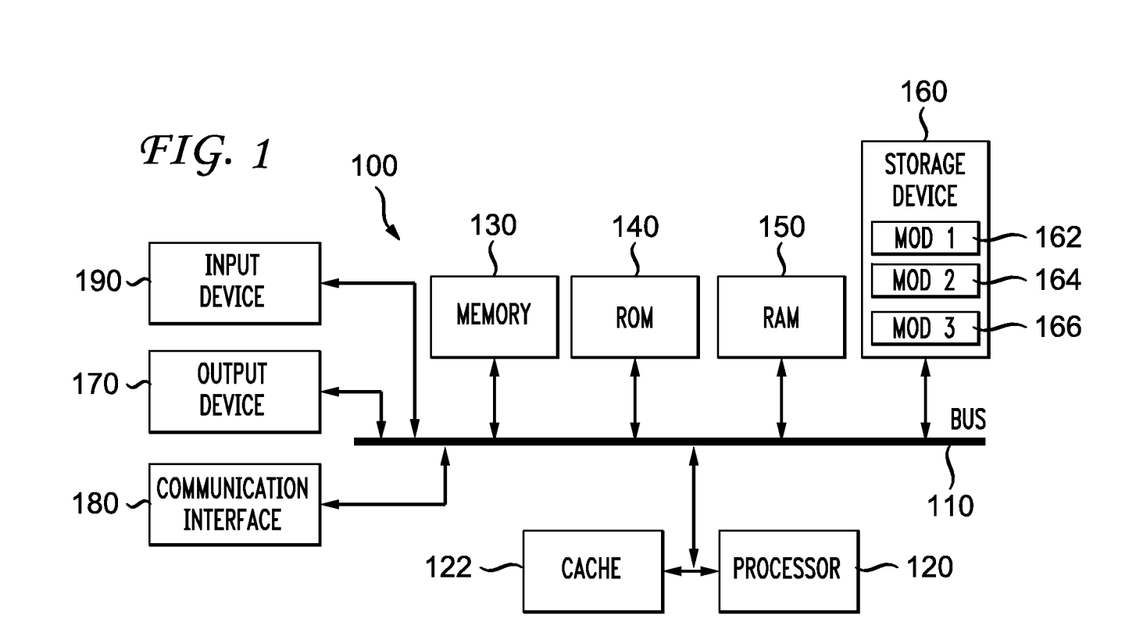
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
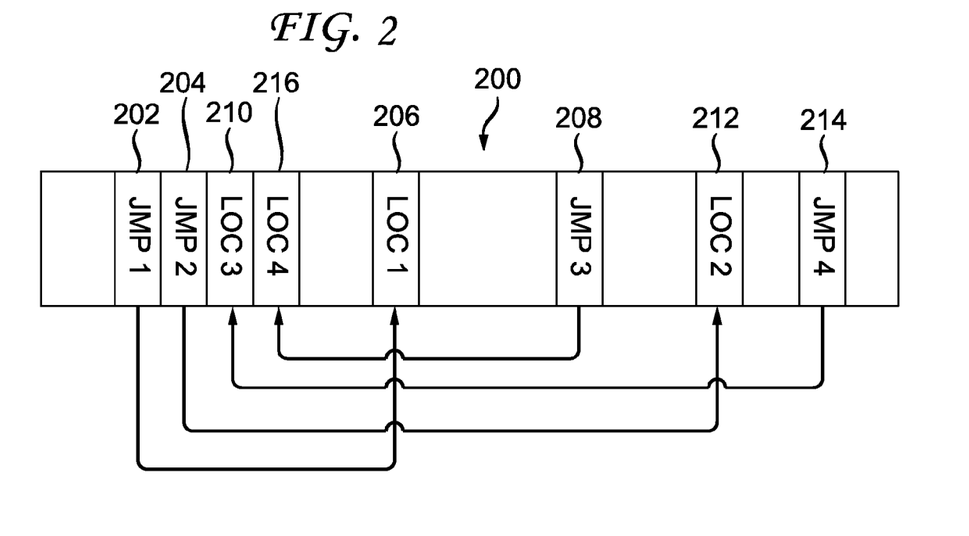
FIG. 2 illustrates an example computer program having branches represented as jump instructions.

Having disclosed some components of a computing system, the disclosure now returns to a discussion of obfuscating branches in computer code using a tree data structure. FIG. 2 illustrates an example computer program 200 having branches represented as jump instructions. In this example computer program 200, code executes from left to right unless a jump instruction moves execution to a different location. So, the computer program 200 starts executing at the left and encounters a conditional statement. If the conditional statement is true, the computer program follows JMP1 202 to LOC1 206, and if the conditional statement is false, the computer program follows JMP2 204 to LOC2 212. Following the true path, the computer program 200 continues execution from LOC1 206 and encounters statement JMP3 208, which returns execution to LOC3 210. Following the false path, the computer program 200 continues execution from LOC2 212 and encounters statement JMP4 214, which returns execution to LOC4 216. In this example, the return address/destination value pairs are LOC3/LOC1, and LOC4/LOC2. However, more than one pair can share a destination value or a return address. In one aspect, only one destination value corresponds to each look-up value.

Figure 3:
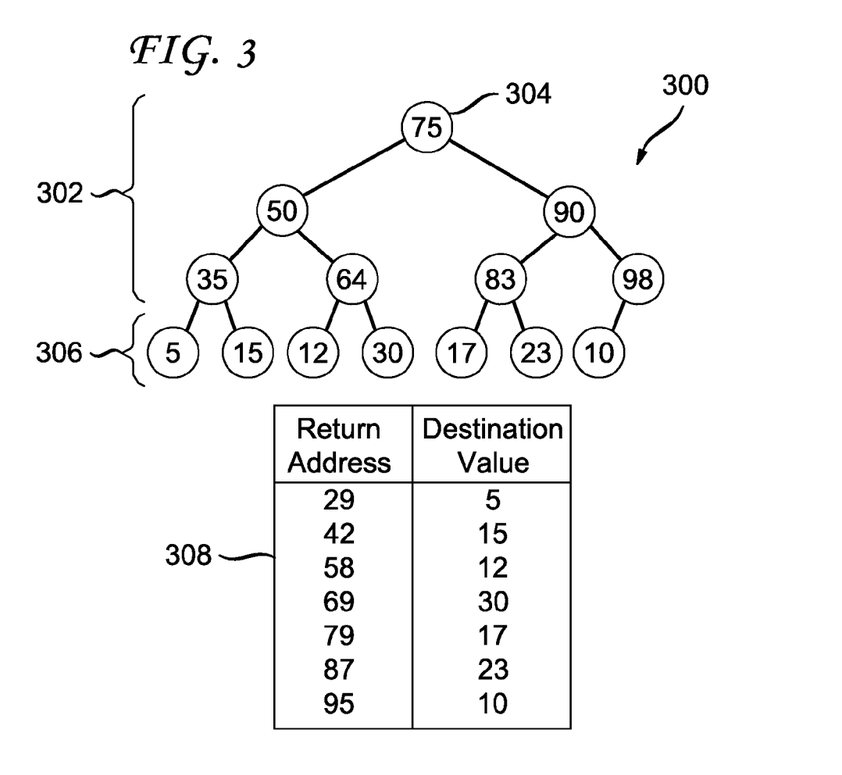
FIG. 3 illustrates an example binary tree constructed according to a set of return address and destination value pairs.

FIG. 3 illustrates an example binary tree 300 constructed according to a set of return address and destination value pairs. The binary tree 300 includes a set of internal nodes 302, a root node 304, and leaf nodes 306. The root node 304 is the beginning point for traversing the tree 300. The set of internal nodes 302 each have one parent node and at least one child node. The leaf nodes 306 have no child nodes. The binary tree 300 was constructed using the table 308 of return address/destination value pairs. Each leaf node 306 stores the destination value portion of a return address/destination value pair. Each leaf node 306 is situated within the binary tree such that traversing the tree based on the return address will lead to the corresponding destination value.

For example, for the first pair of (29, 5), the system knows the value 29 and uses that value to reach the 5. The system first compares 29 to the value at the root node, 75. 29 is less than 75, so the system goes left. 29 is less than 50, so the system goes left again. 29 is less than 35, so the system goes left yet again, to reach the 5. In another example of pair (58, 12), the system first compares 58 to the root node, 75. 58 is less than 75, so the system goes left. 58 is greater than 50, so the system goes right. 58 is less than 64, so the system goes left, to reach the 12. In an example of pair (87, 23) the system first compares 87 to the root node, 75. 87 is greater than 75, so the system goes right. 87 is less than 90, so the system goes left. 87 is greater than 83, so the system goes right, to finally reach the 23. The other destination value pairs in the table 308 can be traversed according to similar logic, moving left when the comparison is less than, and moving right when the comparison is greater than. This binary tree structure can store the destination address information without the return address, while still enabling the system to search the binary tree at runtime using the return address.

The system can include dummy leaf nodes to throw off an attacker that is savvy enough to figure out this obfuscation mechanism. One such position where a dummy node can be inserted is to the right of node 98. Because node 98 only has one child, node 98 has an unused space available for one more child node. The system can generate a random value, reuse an existing value, or otherwise select a value for the dummy node and insert the dummy node into the tree 300. Alternatively, the system can use dummy leaf nodes to pad or round out a tree structure. The system can map the return address to the destination address based on an absolute address or a displacement or offset from the return address or other location. The system can compute and establish the structure of the tree at compile time, using constants for the internal nodes. While FIG. 3 illustrates the leaf nodes 306 of the tree 300 on the same depth from the root node 304, the leaf nodes can occur at multiple different depths, depending on the space allocated for the tree 300, the number of destination value pairs to store in the tree, and/or a minimum or maximum number of comparisons required to traverse the tree 300.

Figure 4:
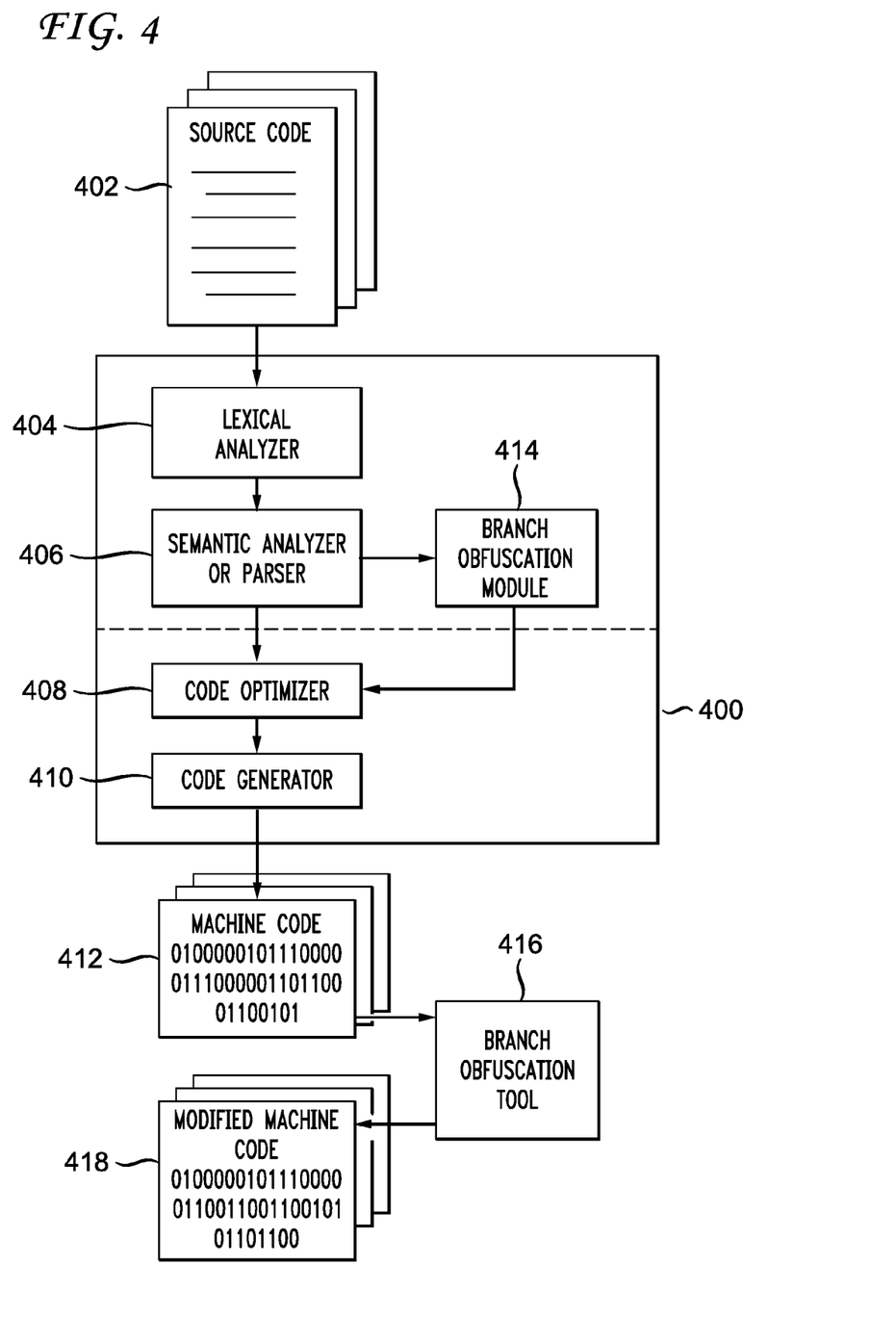
FIG. 4 illustrates a block diagram of an exemplary compiler.

FIG. 4 illustrates a block diagram of an exemplary compiler 400 including sample mechanisms for implementing branch obfuscation 414, 416. The exemplary compiler 400 converts human-readable source code 402 to object code which is understandable to and typically executable by a computing device 100. A compiler 400 is likely to perform the following representative operations as well as other operations: lexical analysis, preprocessing, parsing, semantic analysis, code optimization, and code generation. Compilers are important in the world of computer science and software because they allow programmers to write software using high level languages and convert those high level instructions to binary machine code.

The compiler 400 takes as input source code 402 for a computer program written in a programming language such as C++, Visual Basic, Java, and so forth. The compiler 400 passes the code to the front end of the compiler 400 which includes the lexical analyzer 404 and the semantic analyzer or parser 406. At this stage or at any other stage in the compiler 400, a branch obfuscator module 414 can perform all or part of the steps outlined in FIG. 6 for obfuscating branches in code using a tree structure. The compiler 400 then operates on the source 402 in the back end, which optionally includes the code optimizer 408 and the code generator 410. Often the division between the front end and the back end of a compiler is somewhat blurred. The compiler 400 can include modules other than those shown in FIG. 4, can exclude some of the modules shown in FIG. 4, and can appear in different configurations. Other possible front end components include a preprocessing module and a semantic analysis module, not shown. The front end produces an intermediate representation of the code which is passed to the back end of the compiler 400. The back end of a compiler 400 can include an optimizer 408 and a code generator 410. Finally, the code generator 410 produces machine code 412 or object code. A linker, not shown, can combine the output 410 from several related compiled projects into a single executable file. A branch obfuscation post-compile tool 416 separate from the compiler 400 can process the machine code 412 according to all or part of the steps outlines in FIG. 6 to produce modified machine code 418. The location and timing of the branch obfuscation functionality can determine the granularity of the control over replacing specific branches. In one aspect, both a module 414 in the compiler and a post-compile tool 416 operate together to perform the overall task of branch obfuscation. Other compiler components and modules can be added within the spirit and scope of this disclosure.

Figure 5:
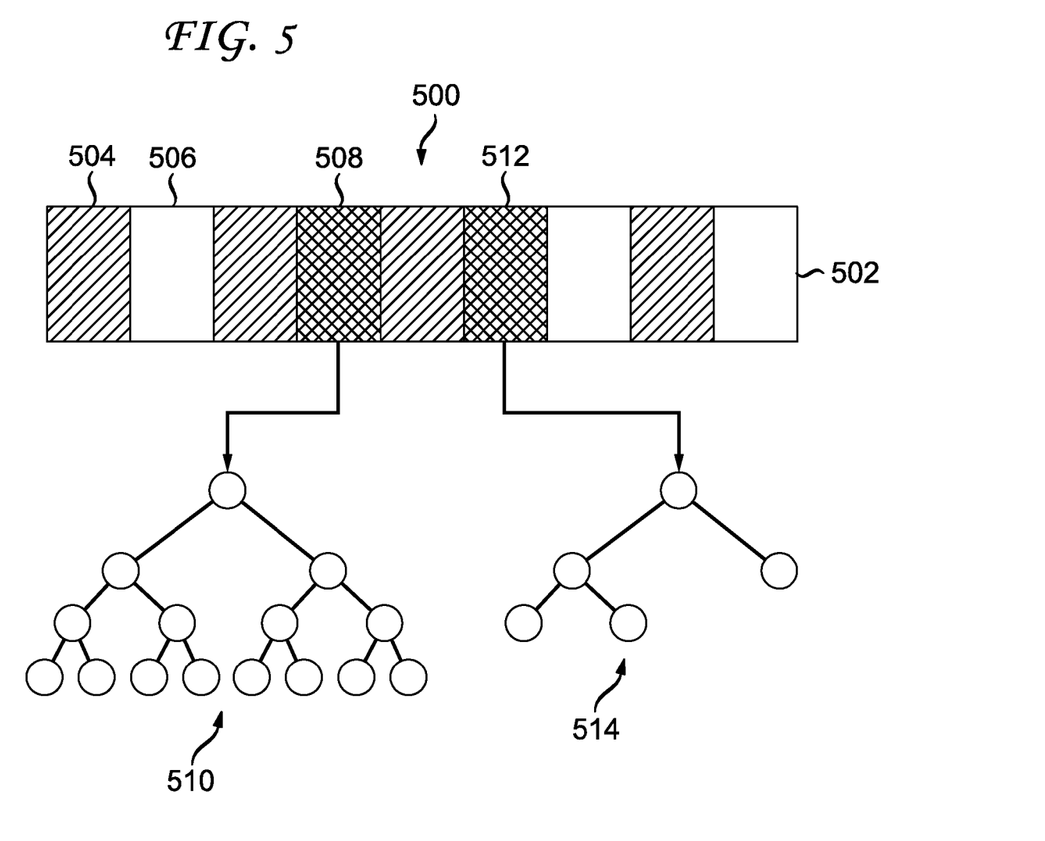
FIG. 5 illustrates an example embodiment that obfuscates branches using a combination of a hash table and a tree.

FIG. 5 illustrates an example embodiment 500 that obfuscates branches using a combination of a hash table and a tree. One drawback to the binary tree structure is that it is slower than using a perfect hash. The average lookup time includes log(n) comparisons. One way to improve performance is to couple the tree with a hash table, such that the hash table stores some of the values and the tree stores other values. The system can try placing the information in the hash table first. If placing the information in the hash table results in a collision, then the system can place the value in a tree. The system can place values associated with a collision in one large tree or the system can establish a separate tree for each slot in the hash table that has a collision. The implementation of one large tree may be slightly simpler, but a separate tree for each collision slot in the hash table can lead to smaller trees that each require fewer comparisons to traverse, which can increase performance.

This technique can guarantee that the look up time for at least a certain percentage of the values will have a constant time O(1). If many collisions are occurring, the system can select a different hash function or can use multiple hash functions. In the case of multiple hash functions, the system can try each hash function in turn until either no collision occurs or all hash functions have been tried. If the value still does not fit in the table after trying all available hash functions, the system can place that value in a tree.

With the tree-hash hybrid approach, the system can incorporate multiple branch functions. When replacing a jump with a call, the system can replace the jump with a call to an appropriate branch function. For example, if one hash and one tree are used, the system replaces a jump whose destination is in the tree with a call to a branch function that can look up the value in the tree. If multiple hashes are used, then at run time the system uses the branch function corresponding to the hash used to place the value in the table for the look up. These same principles can be extended to multiple smaller hash tables and multiple trees.

FIG. 5 illustrates a single hash table 502. The hash table 502 is populated according to a hash algorithm that determines, based on the return address/destination value pair, in which slot to store the destination value. A perfect hash algorithm assigns only one return address/destination value pair to each slot. However, the hash table 502 of FIG. 5 is populated by an imperfect hash algorithm that generates collisions. A collision occurs when two return address/destination value pairs hash to the same slot. The hash table 502 illustrates an example occupied slot 504, an example empty slot 506, and two example collision slots 508, 512. When a collision occurs, the system can generate a tree data structure for the colliding values. FIG. 5 illustrates a first binary tree 510 for the first example collision slot 508, and a second binary tree 514 for the second example collision slot 512. In this example, the values accessible solely through the hash table are accessible in O(1) time, while the values accessible through the binary trees are accessible in O(1) time plus O(log(n)) time, wherein n is based on the number of nodes in the binary tree. Other types of trees may have different performance characteristics. Note that the three leaf nodes in the second binary tree 514 are at multiple depths from the root node.

As an alternative to the arrangement shown in FIG. 5, the values of a single tree do not necessarily hash to a same slot in the table. For example, the tree(s) can be constructed such that all values that collide in any slot in the hash table are placed in the tree(s).

Figure 6:
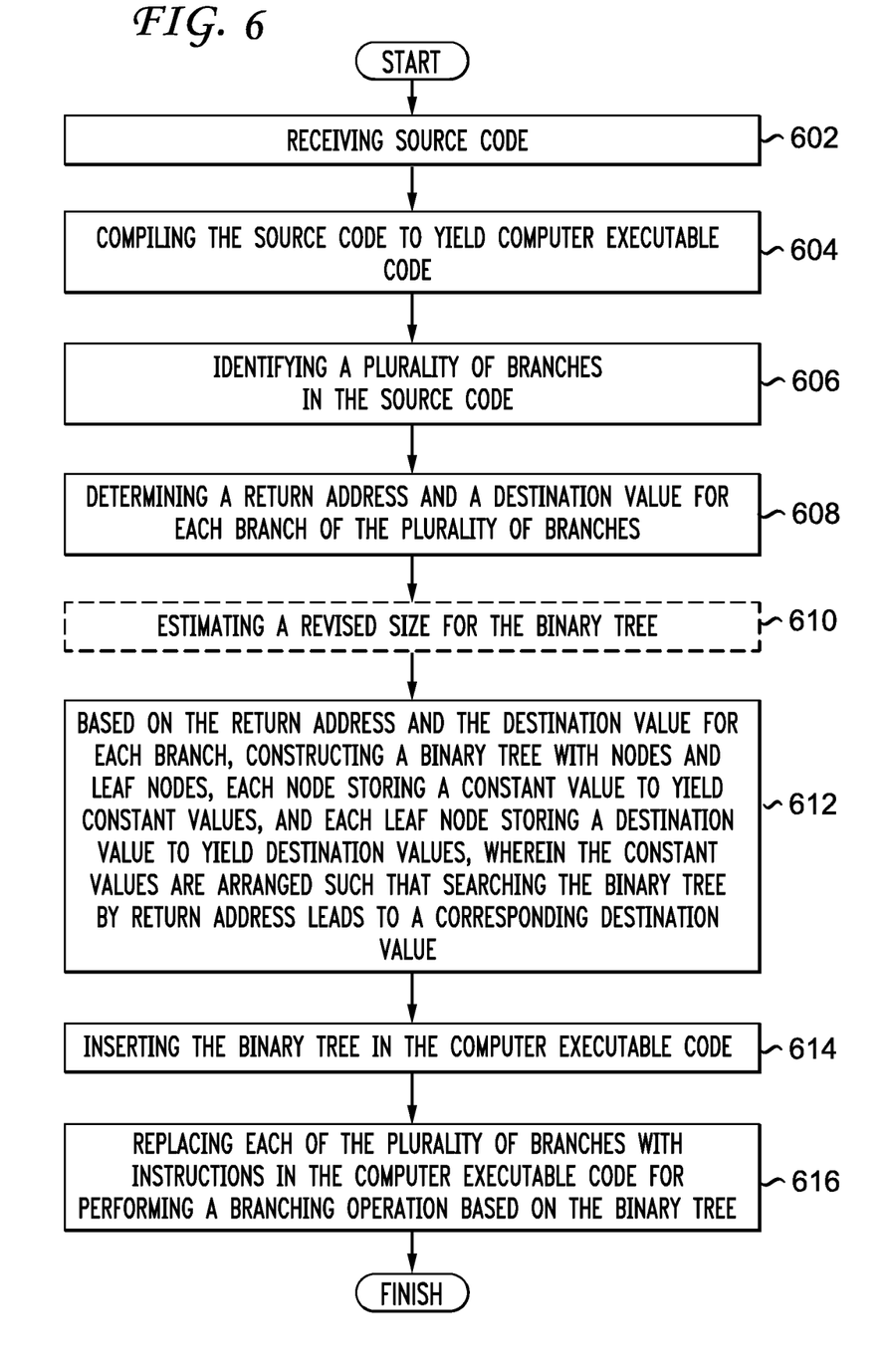
FIG. 6 illustrates a first example method embodiment.
Figure 7:
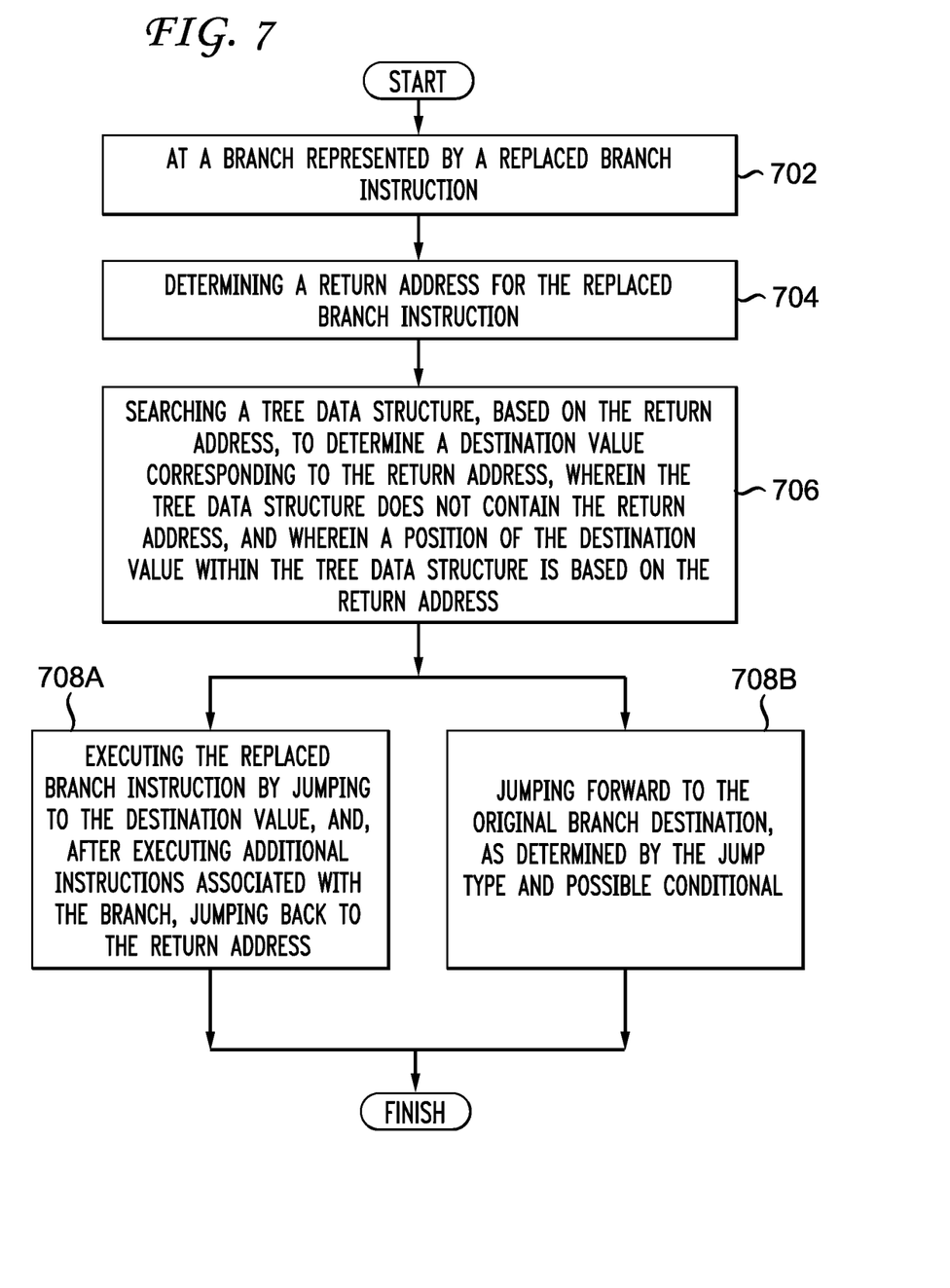
FIG. 7 illustrates a second example method embodiment.

Having disclosed some basic system components and concepts, the disclosure now turns to the exemplary method embodiments shown in FIGS. 6-7. For the sake of clarity, the method embodiments are discussed in terms of an exemplary system 100 as shown in FIG. 1 configured to practice the methods. The steps outlined herein are exemplary and can be implemented in any combination thereof, including combinations that exclude, add, or modify certain steps.

FIG. 6 illustrates an example method embodiment for obfuscating branches while compiling code, but a post-compile tool can perform the same, similar, or equivalent steps. The system 100 receives source code (602). The source code can be human-readable code or can be code at some stage between source and compiled code. The system 100 compiles the source code to yield computer executable code (604) by performing the following steps. The system 100 identifies a set of branches in the source code (606). The branch is a sequence of code that changes execution flow of a program from one location to another location. Some examples of branches include lower level language jump instructions (such as the x86 assembler jump instructions JZ, JNZ, JS, JNS, JO, JNO, JC, JNC, JB, JBE, JAE, JA, JL, JLE, JGE, JG) and conditional or non-conditional statements in higher level languages, such as IF, CASE, SWITCH, FOR, ELSE, GOTO, and so forth.

The system 100 determines a return address and a destination value for each branch of the set of branches (608), and optionally estimates a size for the binary tree (610). The return address can be stored in the tree as a representation of the return address, and not the actual return address. For example, the return address representation can be input into a function that provides the actual return address. Then, the system can construct the binary tree based on the estimated size. If the estimated size of the binary tree is too small to accommodate the set of branches, then the system can replace less than all of the branches. Alternatively, if the estimated size of the binary tree is too small, the system can estimate a revised size for the binary tree and reconstruct the binary tree based on the revised size. If the estimated size of the binary tree is too large, the system can pad the empty space in the binary tree with dummy values, or can reconstruct the binary tree according to the smaller size to conserve space in the resulting binary file.

Then, based on the return address and the destination value for each branch, the system 100 constructs a binary tree with nodes and leaf nodes, each node storing a constant value to yield constant values, and each leaf node storing a destination value to yield destination values, wherein the constant values are arranged such that searching the binary tree by return address leads to a corresponding destination value (612). The system can insert in the tree dummy leaf nodes with destination value that are not intended for use. The system can fill leftover space in the tree with dummy leaf nodes or can account for a certain number of dummy leaf nodes when estimating the size of the binary tree. The tree does not store return addresses for the set of branches.

The tree can include a root node with no parent. The other non-root nodes have at least one child node, and leaf nodes have no child nodes. The tree can be an ordered directed tree. The tree can be any of a number of tree structures, including a binary tree, a B tree, or a multi-way tree. The system 100 inserts the binary tree in the computer executable code (614). The system can insert the tree into the data section and/or the text section of the executable code. The system 100 replaces each of the set of branches with instructions in the computer executable code for performing a branching operation based on the binary tree (616).

FIG. 7 illustrates an example method embodiment for executing code having the branches obfuscated. At a branch represented by a replaced branch instruction (702), the system 100 performs the following steps. The system 100 determines a return address for the replaced branch instruction (704). Then the system 100 searches a tree data structure, based on the return address, to determine a destination value corresponding to the return address, wherein the tree data structure does not contain the return address, and wherein a position of the destination value within the tree data structure is based on the return address (706). The system 100 can then execute the replaced branch instruction by jumping to the destination value, and, after executing additional instructions associated with the branch, jumping back to the return address (708A) or jump forward to the original branch destination as determined by the jump type and possible conditional (708B).

The principles set forth herein can be applied to a single binary tree, a binary tree and a hash table, multiple binary trees and a hash table, a single binary tree and multiple hash tables, multiple binary trees and multiple hash tables, or any other mix of trees of any type and hash tables. The examples set forth herein are illustrative and do not limit the specific implementations of these concepts to a single tree and single hash table.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving source code;
   compiling, via a processor, the source code to yield computer executable code, wherein compiling includes steps comprising:
      identifying a plurality of branches in the source code;
      determining a return address and a destination value for each branch of the plurality of branches;
      based on the return address and the destination value for each branch, constructing a binary tree data structure with nodes and leaf nodes, each node storing a constant value to yield constant values, and each leaf node storing a destination value to yield destination values, wherein the constant values are arranged such that searching the binary tree data structure by return address leads to a corresponding destination value;
      inserting the binary tree data structure in the computer executable code; and
      replacing each of the plurality of branches with instructions in the computer executable code for performing a branching operation based on the binary tree data structure.

2. The method of claim 1, wherein at least one of the leaf nodes stores a dummy destination value that is not intended for use.

3. The method of claim 1, wherein the binary tree data structure does not store return addresses for the plurality of branches.

4. The method of claim 1, wherein compiling includes steps further comprising:
   estimating a size for the binary tree data structure based on the plurality of branches; and
   constructing the binary tree data structure based on the size.

5. The method of claim 4, wherein if the binary tree data structure is too small to accommodate the plurality of branches, then replacing less than all of the plurality of branches with instructions in the computer executable code for performing the branching operation based on the binary tree data structure.

6. The method of claim 4, wherein if the binary tree data structure is too small to accommodate the plurality of branches, the compiling includes steps further comprising:
   estimating a revised size for the binary tree data structure; and
   reconstructing the binary tree data structure based on the revised size.

7. The method of claim 1, wherein identifying the plurality of branches in the source code is based on collisions in a hash function.

8. The method of claim 1, wherein each leaf node stores a representation of the destination value, wherein the destination value is derivable from the representation.

9. A system comprising:
   a processor;
   a memory storing instructions for controlling the processor to perform steps comprising:
      receiving compiled code;
      determining a return address and destination value pair for each branch of a plurality of branches in the compiled code;
      based on the return address and the destination value for each branch, constructing a binary tree data structure with nodes and leaf nodes, each node storing a constant value to yield constant values, and each leaf node storing a destination value to yield destination values, wherein the constant values are arranged such that searching the binary tree data structure by return address leads to a corresponding destination value;
      inserting the binary tree data structure in the compiled code; and
      replacing each of the plurality of branches with instructions in the compiled code for performing a corresponding branching operation based on the binary tree data structure.

10. The system of claim 9, wherein nodes have at least one child node, and leaf nodes have no child nodes.

11. The system of claim 9, wherein the binary tree data structure is an ordered directed tree.

12. The system of claim 9, wherein the plurality of branches is identified based on collisions in a hash function.

13. A non-transitory computer-readable storage medium storing instructions which, when executed by a computing device, cause the computing device to perform steps comprising:
   at a branch represented by a replacement branch instruction:
      determining a return address for the replacement branch instruction;
      searching a tree data structure, based on the return address, to determine a destination value corresponding to the return address, wherein the tree data structure does not contain the return address, and wherein a position of the destination value within the tree data structure is based on the return address; and
      executing the replacement branch instruction by jumping to the destination value, and, after executing additional instructions associated with the branch, jumping back to the return address.

14. The non-transitory computer-readable storage medium of claim 13, wherein the tree data structure is one of a binary tree, a B tree, and a multi-way tree.

15. The non-transitory computer-readable storage medium of claim 13, wherein the branch is a jump instruction.

16. The non-transitory computer-readable storage medium of claim 13, wherein the position of the destination value within the tree data structure is such that traversing the tree data structure based on the return address leads to the destination value.

17. A system comprising:
   a processor;
   a memory storing instructions for controlling the processor to perform, at a branch represented by a replacement branch instruction, steps comprising:
      determining a return address for the replacement branch instruction;
      searching a tree data structure, based on the return address, to determine a destination value corresponding to the return address, wherein the tree data structure does not contain the return address, and wherein a position of the destination value within the tree data structure is based on the return address; and
      executing the replacement branch instruction by jumping to the destination value, and, after executing additional instructions associated with the branch, jumping back to the return address.

18. The system of claim 17, wherein the tree data structure is balanced to minimize traversal steps to access leaf nodes in the tree data structure.

19. The system of claim 17, wherein the position of the destination value within the tree data structure is such that traversing the tree data structure based on the return address leads to the destination value.

20. The system of claim 17, wherein at least one leaf node in the tree data structure stores a dummy destination value.

21. A method comprising:
receiving code including a plurality of branches;
obfuscating, via a processor the plurality of branches via a hash table, based on a respective return address and destination value pair for at least some of the plurality of branches;
identifying collisions in the hash table;
for each collision in the hash table, inserting, via the processor, in a binary tree data structure a respective collision return address having a corresponding collision destination value, each internal node of the binary tree data structure storing a constant value to yield constant values, and each leaf node of the binary tree data structure storing a destination value to yield destination values, wherein the constant values are arranged such that searching the binary tree data structure by return address leads to a corresponding destination value;
inserting, via the processor, the binary tree data structure in the code; and
replacing, via the processor, branches corresponding to collisions with instructions in the code for performing a corresponding branching operation based on the binary tree data structure.

22. The method of claim 21, wherein the binary tree data structure is one of a binary tree, a B tree, and a multi-way tree.

23. The method of claim 21, wherein the binary tree data structure is balanced to minimize average traversal time to each leaf node.

24. The method of claim 21, wherein respective collision return addresses are inserted into a plurality of binary tree data structures.

25. The method of claim 21, wherein the binary tree data structure is stored in a text section of the code.

* * * * *

UNITED STATES PATENT AND TRADEMARK OFFICE
CERTIFICATE OF CORRECTION

PATENT NO. : 8,751,823 B2
APPLICATION NO. : 13/195748
DATED : June 10, 2014
INVENTOR(S) : Gideon M. Myles et al.

Page 1 of 1

It is certified that error appears in the above-identified patent and that said Letters Patent is hereby corrected as shown below:

In the Drawings:

In FIG. 2, the arrow from JMP 3 (208) should go to LOC 3 (210) and the arrow from JMP 4 (214) should go to LOC 4 (216).

Signed and Sealed this
Twenty-third Day of September, 2014

Michelle K. Lee
*Deputy Director of the United States Patent and Trademark Office*